United States Patent [19]

Leuthold et al.

[11] Patent Number: 5,685,647
[45] Date of Patent: *Nov. 11, 1997

[54] SINGLE PLATE HYDRODYNAMIC BEARING WITH SELF-BALANCING FLUID LEVEL AND FLUID CIRCULATION

[75] Inventors: Hans Leuthold; David John Jennings, both of Santa Cruz; Wesley Ronald Clark, Watsonville; Raquib Khan, Pleasanton; Guenther Heine, Aptos, all of Calif.

[73] Assignee: Seagate Technology, Inc., Scotts Valley, Calif.

[ * ] Notice: The term of this patent shall not extend beyond the expiration date of Pat. No. 5,487,608.

[21] Appl. No.: 472,338

[22] Filed: Jun. 7, 1995

Related U.S. Application Data

[63] Continuation of Ser. No. 278,754, Jul. 22, 1994, Pat. No. 5,487,608.
[51] Int. Cl.$^6$ .................................................. F16C 17/10
[52] U.S. Cl. .......................... 384/113; 384/130; 384/292
[58] Field of Search .................................. 384/113, 121, 384/115, 381, 380, 123, 292, 130

[56] References Cited

U.S. PATENT DOCUMENTS

| 5,018,881 | 5/1991 | Asada | 384/113 |
| 5,052,822 | 10/1991 | Van Beek | 384/123 |
| 5,120,139 | 6/1992 | Asada et al. | 384/113 |
| 5,370,463 | 12/1994 | Asada et al. | 384/113 |

OTHER PUBLICATIONS

Application of Finite Element Methods to Lubrication: An Engineering Approach, Oct. 1, 1972, Booker J. F. /Huebner K.H., Journal of Lubrication Technology.

Analysis and Design of Spiral Groove Bearings, Jul. 1, 1967, Muijderman, E. A., Journal of Lubrication Technology.

The Lead Capacity & Stability haracteristics of Hydrodynamic Grooved Journal Bearings, Oct. 13, 1964, Hirs, G. G., Lubrication Conference.

Primary Examiner—Lenard A. Footland
Attorney, Agent, or Firm—Flehr Hohbach Test Albritton and Herbert

[57] ABSTRACT

The present invention includes four sections or partitions: two thrust bearings which are formed by the sides of a grooved thrust plate and corresponding countersurfaces, the thrust bearings designed to cause fluid flow in a single direction up around the rotating thrust plate and upward along the surface of a rotating journal, and two journal bearings formed side-by-side on the journal formed between a rotating shaft and a bushing with multiple spiral-grooved sections being formed on the rotating shaft or in the stationary bushing. The two journal bearings are separated by a circumferential groove in the shaft which is connected by a radial bore to a hollow reservoir in the shaft for providing fluid to the journal bearing and the thrust bearing. By providing this bore and a second bore located near to the thrust bearing, the boundary conditions for the combined journal bearings and thrust bearings are fixed and a stable rotating shaft is achieved.

7 Claims, 9 Drawing Sheets

SINGLE PLATE HYDRODYNAMIC BEARING WITH SELF-BALANCING FLUID LEVEL AND FLUID CIRCULATION

RELATED APPLICATIONS

This application is a continuation of U.S. application Ser. No. 08/278,754 filed Jul. 22, 1994, now U.S. Pat. No. 5,487,608, issued Jan. 30, 1996.

This application is related to and may be used in common with the invention disclosed in application Ser. No. 08/279,194 filed Jul. 22, 1994 entitled "Device for Manufacturing a Groove Bearing", inventor: Clark et al., application Ser. No. 08/278,796 filed Jul. 22, 1994 entitled "Squeeze Film Damping for a Hard Disc Drive", inventor: Jennings et. al, application Ser. No. 08/279,199 filed Jul. 22, 1994 entitled "Hub Disc Assembly With Integrated Air-bearing", inventor: H. Leuthold et. al, as well as A-59756 entitled "Single Plate Hydrodynamic Bearing With Self-Balancing Fluid Level", inventor: Hans Leuthold et al., all of said applications being assigned to the assignee of the present invention and incorporated herein by reference.

FIELD OF THE INVENTION

The present invention relates to the field of hydrodynamic beating assemblies of the type which provide support and rotation for high speed spindle element. More specifically, the present invention relates to hydrodynamic bearing assemblies utilized in the computer disc drive recording system.

BACKGROUND OF THE INVENTION

Disc drive memory systems have been used in computers for many years for storage of digital information. Information is recorded on concentric memory tracks of a magnetic disc medium, the actual information being stored in the form of magnetic transitions within the medium. The discs themselves are rotatably mounted on a spindle the information being accessed by means of read/write heads generally located on a pivoting arm which moves radially over the surface of the disc. The read/write heads or transducers must be accurately aligned with the storage tracks on the disc to ensure proper reading and writing of information.

During operation, the discs are rotated at very high speeds within an enclosed housing by means of an electric motor generally located inside the hub or below the discs. One type of motor in common use is known as an in-hub or in-spindle motor. Such in-spindle motors typically have a spindle mounted by means of two ball bearing systems to a motor shaft disposed in the center of the hub. One of the bearings is typically located near the top of the spindle and the other near the bottom. These bearings allow for rotational movement between the shaft and the hub while maintaining accurate alignment of the spindle to the shaft. The bearings themselves are normally lubricated by grease or oil.

The conventional bearing system described above is prone, however, to several short comings. First is the problem of vibration generated by the balls rolling on the raceways. Ball bearings used in hard disk drive spindles run under conditions that generally guarantee a physical contact between raceways and bails, this in spite of the lubrication layer provided by the bearing oil or grease. Hence, bearing balls running on the generally even and smooth, but microscopically uneven and rough raceways, transmit this surface structure as well as their imperfections in sphericity in the form of vibration to the rotating disk. This vibration results in misalignment between the data tracks and the read/write transducer. This source of vibration limits therefore the datatrack density and the overall performance of the disc drive system.

Another problem is related to the application of hard disk drives in portable computer equipment and the resulting requirements in shock resistance. Shocks create relative acceleration between the disks and the drive casting which in turn shows up as a force across the bearing system. Since the contact surfaces in ball bearings are very small, the resulting contact pressures may exceed the yield strength of the bearing material and leave permanent deformation and damage on raceways and balls.

Moreover, mechanical bearings are not always scalable to smaller dimensions. This is a significant draw back since the tendency in the disc drive industry has been to continually shrink the physical dimensions of the disc drive unit.

As an alternative to conventional ball bearing spindle systems, researchers have concentrated much of their efforts on developing a hydrodynamic bearing. In these types of systems, lubricating fluid—either gas or liquid—functions as the actual beating surface between a stationary base or housing and the rotating spindle or rotating hub and the stationary surrounding portion of the motor. For example, liquid lubricants comprising oil, more complex ferromagnetic fluids, or even air have been utilized for use in hydrodynamic bearing systems. The reason for the popularity of the use of air, is the importance of avoiding the outgassing of contaminants into the sealed area of the head disc housing. However, air does not provide the lubricating qualifies of oil. Its low viscosity requires smaller bearing gaps and therefore higher tolerance standards to achieve similar dynamic performance.

Thus, in the case of a hydrodynamic beating employing a liquid lubricant, the lubricating fluid and its components must be sealed within the bearing to avoid loss of lubricant which results in reduced beating load capacity. Otherwise, the physical surfaces of the spindle and housing could contact one another, leading to increased wear and eventual failure of the bearing system. Equally seriously, loss of a seal or failure to control the fluid level within the bearing system could cause contamination of the hard disk drive with lubricant particles and droplets as well as outgassing-related condensation.

It is a further important problem that start-stop cycles and load exceeding the bearing capacity result in wear-and-tear of the bearing surface. This creates particles which are free to move in the lubrication film and which will act as slurry, thus accelerating said wear-and-tear.

A further difficulty with prior art designs of liquid lubrication hydrodynamic bearings is that frequently voids or gas bubbles may occur in the bearing area thereby reducing the effective bearing surface and the related load capacity.

Yet another difficulty of known hydrodynamic bearing designs is their sensitivity to both machining tolerances and the temperature ranges across which they must be operable. Both of these issues are critical in hydrodynamic bearings because of the very narrow gaps between the rotating and stationary parts which must be maintained so that the fluid is effective in lubricating the bearing surfaces, while the tolerance between the bearing surfaces is not so great as to allow tilting of the rotating disks supported by the rotating spindle motor out of the horizontal plane. Thus, it is dear that a number of considerations must be balanced in designing an effective hydrodynamic bearing spindle motor for use in a disk drive.

SUMMARY OF THE INVENTION

It is therefore an objective of the present invention to provide a hydrodynamic bearing which is simple and highly adaptable and scalable for use within an information storage unit such as a computer disk drive system.

It is a further purpose of the present invention to provide a hydrodynamic bearing in which the fluid level and sealing of the fluid within the hydrodynamic bearing is controlled in order to avoid potential contamination of the hard disk drive by lubricant particles and droplets, as well as outgassing-related condensation.

It is a related objective of the present invention to provide a hydrodynamic bearing in which the fluid circulation is controlled and directed so that wear-and-tear on the bearing surface is minimized; it is further an objective that the circulation be adapted to wash off particles out of the bearing surface into the reservoir area.

A further related objective of the present invention is to provide for fluid circulation within the hydrodynamic bearing that minimizes the possibility of voids within the lubricant that could lead to unnecessary wear, and further that maintains and replenishes the lubricant within the bearing from an appropriately located reservoir so that a film of lubricant is maintained within the bearing.

Another objective of the present invention is to provide a bearing design with optimized forced boundary conditions between the various sections of the bearings to optimize the fluid flow and increase the insensitivity to temperature and machining tolerances, providing a greater consistency of the dynamic performance of the invention.

In summary, the present invention includes four sections or partitions: two thrust bearings which are formed by the sides of a grooved thrust plate and corresponding countersurfaces, the thrust bearings designed to cause fluid flow in a single direction up around the rotating thrust plate and upward along the surface of a rotating journal, and two journal bearings formed side-by-side on the journal formed between a rotating shaft and a bushing with multiple spiral-grooved sections being formed on the rotating shaft or in the stationary bushing. The two journal bearings are separated by a circumferential groove in the shaft which is connected by a radial bore to a hollow reservoir in the shaft for providing fluid to the journal bearing and the thrust bearing. By providing this bore and a second bore located near to the thrust bearing, the boundary conditions for the combined journal bearings and thrust bearings are fixed and a stable rotating shaft is achieved.

Other features and advantages of the present invention will become apparent to a person of skill in the art who studies the following detailed description of a preferred embodiment, given in conjunction with the accompanying drawings.

DETAILED DESCRIPTION OF A PREFERRED EMBODIMENT

A spindle motor and disc assembly for use in disc drive computer systems is disclosed herein. The special purpose of the present invention is to modify the design of a spindle motor incorporating a hydrodynamic beating for the main rotating shaft for use in a hard disc drive application so that the lubrication fluid does not contaminate the inside of the hard disc drive with particles, droplets or outgassing. A major concern in the design of a hydrodynamic hard disc drive spindle is to make sure that the lubricant or fluid stays confined to the region where it lubricates the rotating surfaces, and cannot migrate toward the regions where the data storing discs are located.

Figure 1:
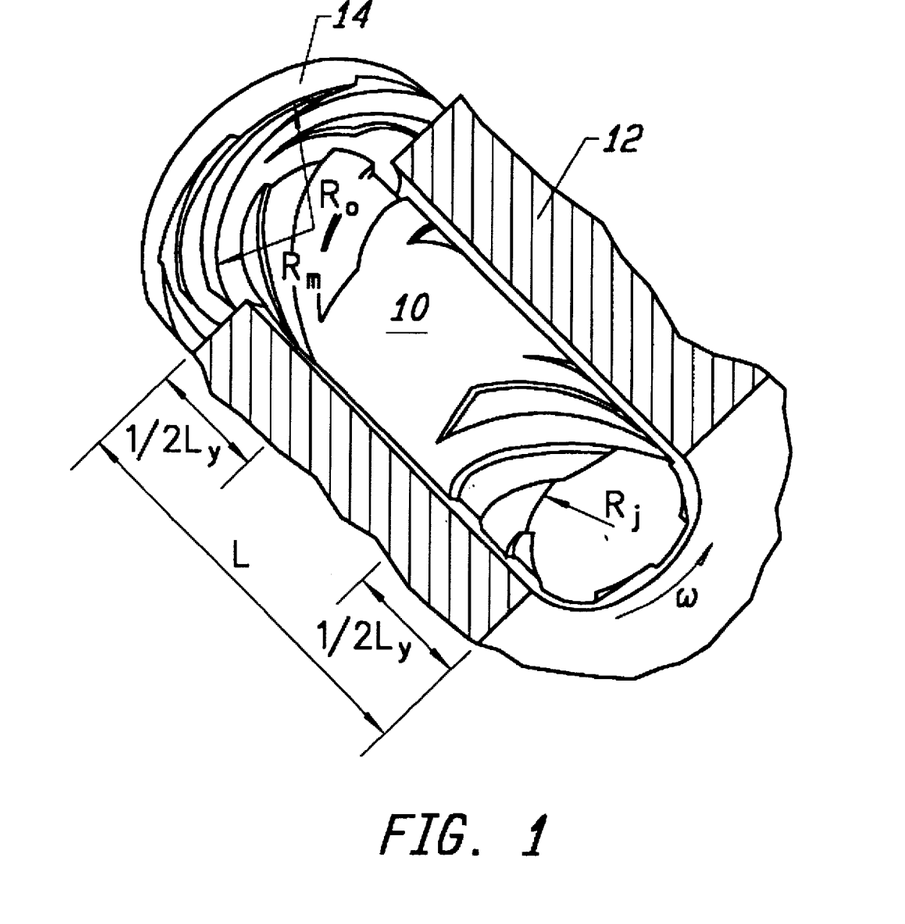
FIG. 1 is an illustration useful in demonstrating the principles of operation of a hydrodynamic bearing.

The basic principle of the present invention is based on a hydrodynamic bearing as already known in the technology, an example of which is shown in FIG. 1. As shown herein, a journal bearing built upon a shaft 10 rotating inside a bushing 12, one of the opposing two surfaces (in this case the shaft) carrying cylindrical sections of spiral grooves. A thrust plate 14 may also be provided with concentric spiral groove sections. The rotation of the shaft churns and pumps the fluid as a function of the direction, width, and angle of the grooves with respect to the sense of rotation. The pumping action builds up multiple pressure zones along the journal and the thrust plates, maintaining a fluid film between the rotating parts, and providing the stiffness of the bearing.

Obviously, with such rotation and pumping and churning of the fluid, the chance for fluid to spill out of the end of bearing is always present. This was the origin and impetus for the present invention.

Figure 2:
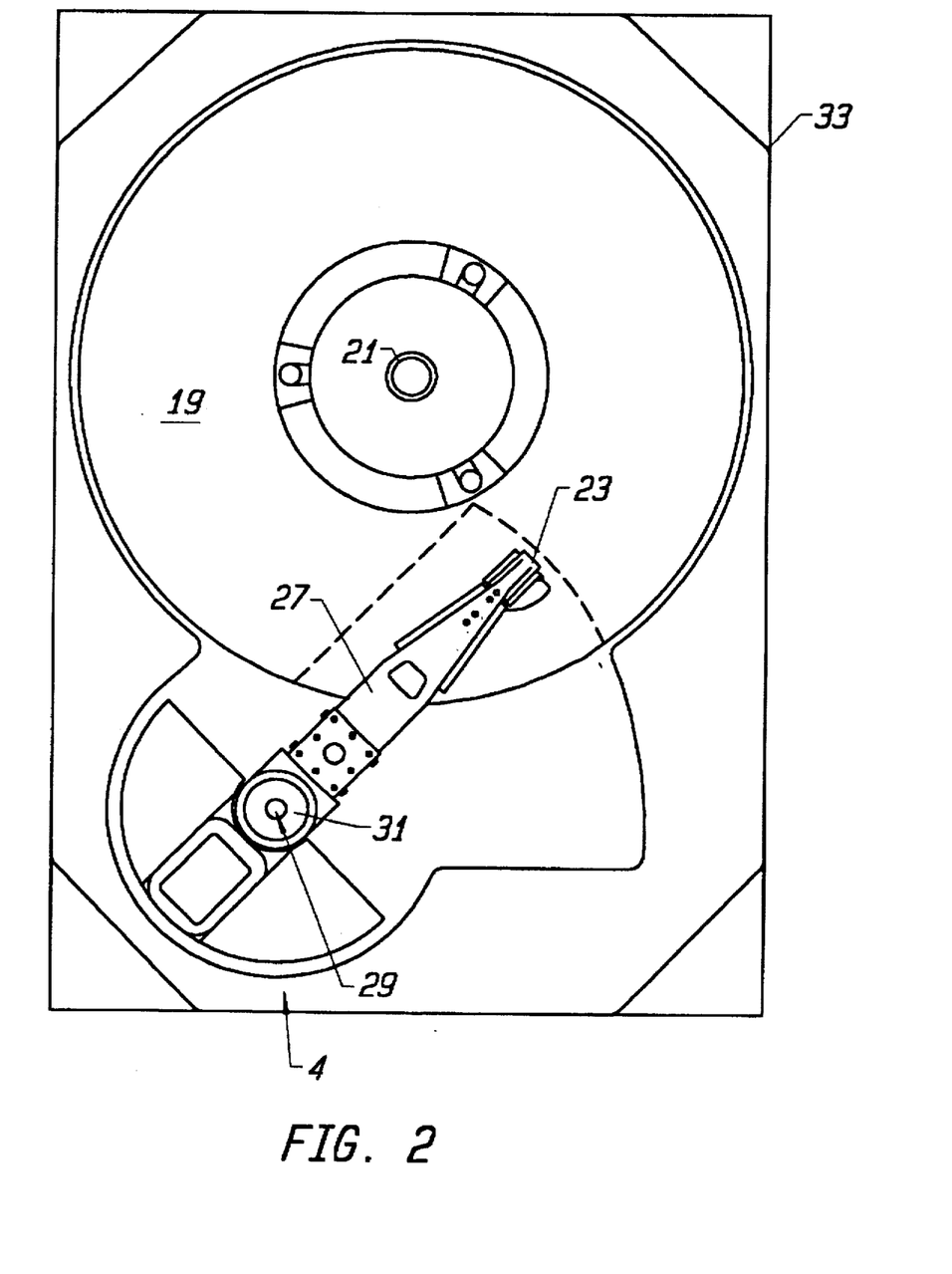
FIG. 2 is a top plan view of a disc drive in which the present invention is useful.

In the following description, numerous specific details are set forth such as material types, thickness, speeds in order to provide a thorough understanding of the invention. It will be obvious, however, to one of skill in the art that these specific details need not be used to practice the present invention. In other instances, well known structures and processing steps have not been described in particular detail in order to avoid unnecessarily obscuring the present invention. Thus, referring next to FIG. 2, this figure is a top plan view illustrating the basic element of a disc drive including the rotating disc or discs 19 which are rotated by the spindle 21 of a spindle motor (not shown). As the discs rotate, a transducer 24 mounted on the end of an actuator arm 27 is selectively positioned by a voice coil motor 29 rotating about a pivot 31 to move the transducer 23 from track to track over the surface of the disc. All of these elements are mounted in a housing 33 which is typically an air-tight housing to minimize the possibility of any contaminants reaching the surface of the disc. Such contaminants could interfere with the reading and writing of data on the surface of the disc by the transducer, the transducer itself having an extremely fine gap at which reading/writing occurs, and in today's technology flying extremely close to the surface of the disc. A typical spindle motor for providing constant high-speed rotation to the disc mounted thereon is shown in vertical section in FIG. 3.

Figure 3:
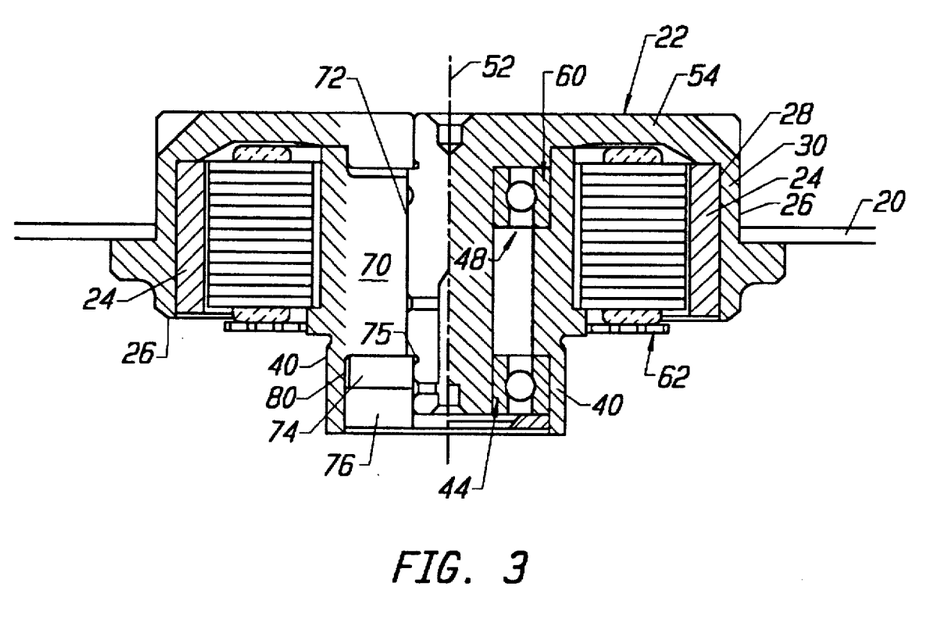
FIG. 3 is a vertical sectional view of a motor incorporating the hydrodynamic bearing of the present invention.

This figure shows only a single disc 19 supported from the spindle or hub 21; obviously a significant number of discs could be supported from the hub of a motor of this type here. The figure is intended to show, for the sake of comparison, both the old and the new approach to bearing supports for a rotating shaft type of motor. Therefore, both the right and left hand portions of the figure show a magnet 24 supported on the interior vertical surface of the cavity defining hub element 30. A stator 26 is supported by the sleeve 40 which is adapted to be fitted into a base of the housing 34 at its lower end. On the right hand side standard mechanical bearings 44, 48 support the rotating shaft 52 for rotation about the central axis 52. Obviously the top horizontal portion of the hub 54 and the vertical disc supporting portion of the hub 30 rotate with this shaft. Meanwhile, the outer race 60 of each bearing supports the sleeve which in turn supports the stator on an external surface thereof. The energization of the stator to cause rotation of the hub by interaction of the stator with the magnet 24 is caused by controlled electrical signals provided on wires 62 to the coil windings.

The left hand view of FIG. 3 shows the basic elements of the hydrodynamic bearings of the present invention. In this case, rather than finding ball bearings 48 and 44 supporting the interior surface of the sleeve, the sleeve is a single solid stationary piece 70 which on its interior surface 72 forms the bushing of the journal bearing. This bushing 72 faces the shaft 52 which is rotating past the fixed bushing.

At the lower end of the rotating shaft 52 near the base of the disc drive, a thrust plate 74 is stepped into the shaft near its lower end, and extends into a recess defined by the lower end of the bushing 72 and the upper surface of counterplate 76. This counterplate 76 to the thrust plate 74 is preferably pressed in place against the lower portion 40 of the sleeve, or sits against a step in the bushing in order to fix its position.

Figure 4:
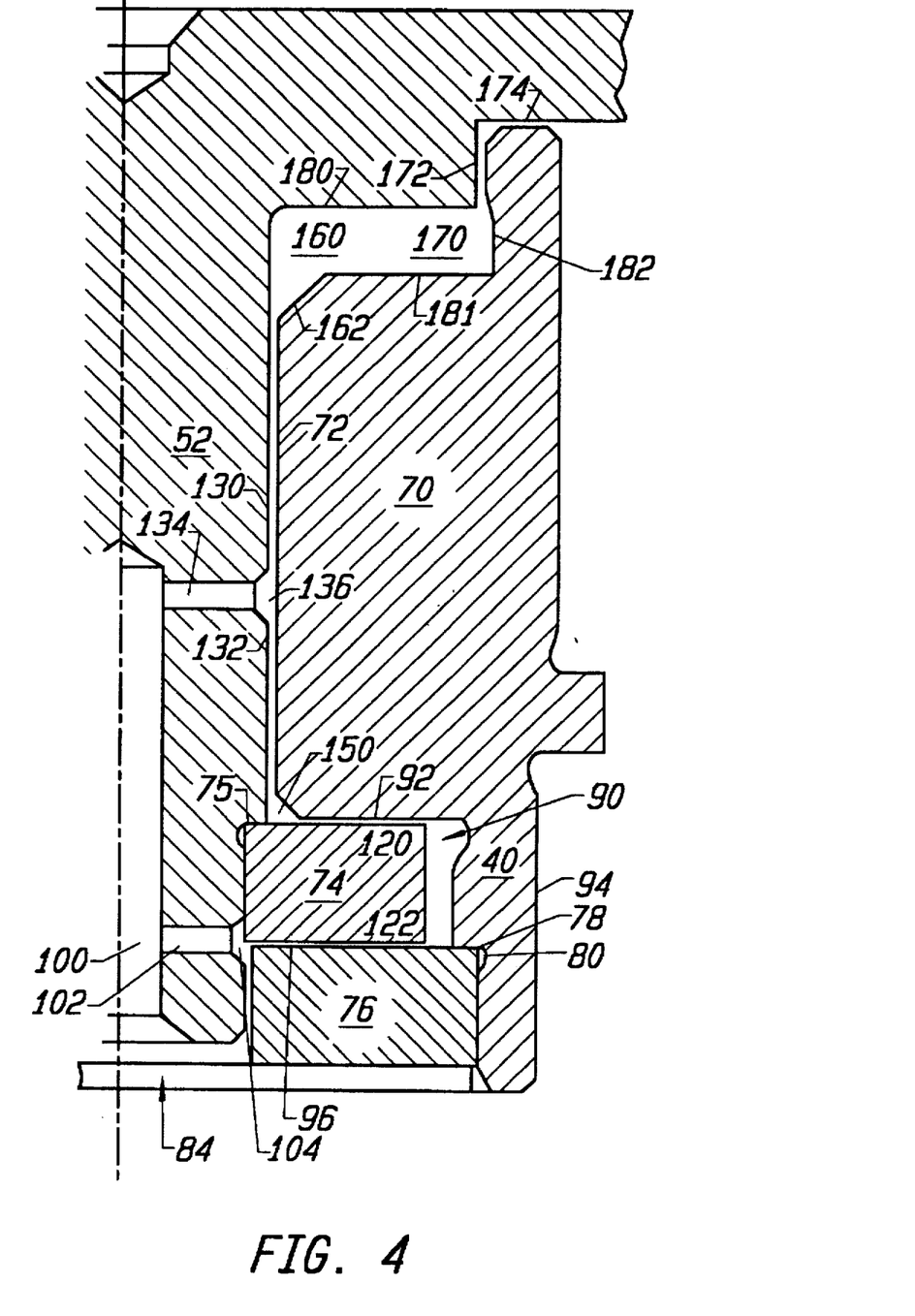
FIG. 4 is a detailed view of a section of the hydrodynamic bearing of the motor of FIG. 3.

The details of the present invention, and especially the placement of the elements and the gaps defined thereby, can best be understood hereafter by reference to FIG. 4, which is an enlarged view of the details of the hydrodynamic bearing shown on the left-hand side of the motor of FIG. 3. It can be seen, referring to the counterplate 76, that a small recess 80 is provided in the lower inner portion of the stationary sleeve 70 to allow the counterplate 76 to be stepped into place. It should be noted that the location of this step 78 in the sleeve for locating the counterplate is important, as the axial location of the counterplate 76 will define the sum of the gaps in the lower thrust bearing for a given thrust plate 74 thickness.

Figure 5:
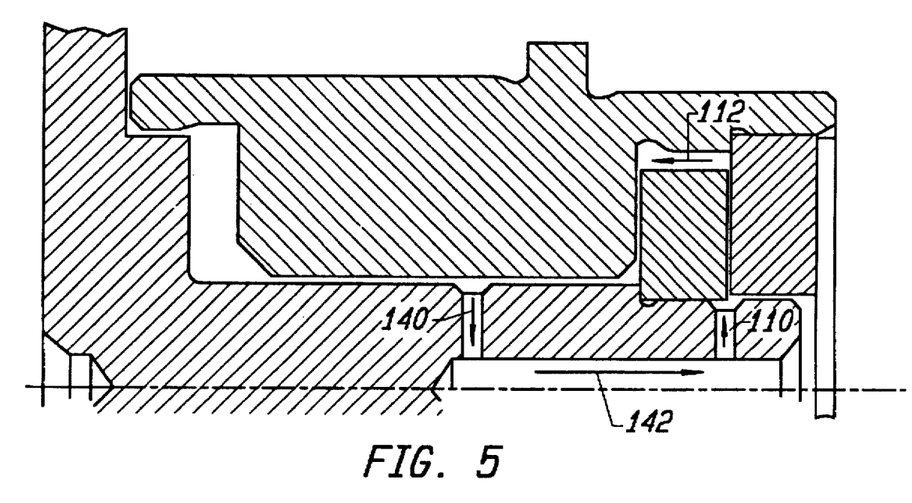
FIG. 5 is a sectional view similar to FIG. 4 useful in illustrating the fluid circulation path in the hydrodynamic bearing of the present invention.

Immediately below the counterplate 76 is located a shield 84 which is provided to close the bearing assembly from the outside. Obviously, although not shown herein, the lower outer portion of the sleeve could be inserted in the base casting of the disc drive in order to securely hold the entire spindle motor in a precise location and orientation. Returning to the lower thrust bearing, it is clear that since the thrust plate 74 is rotating in a recess 90 defined by the bushing 70 on its upper side, the sleeve 40 to the side, and the counterplate 76 at the lower end, these positions must all be securely fixed as the gaps are very free. The thrust beating thus comprises the gap 92 between bushing 72 and thrust plate 74, the gap 94 between sleeve 40 and thrust plate 74, and the gap 96 between thrust plate 74 and counterplate 76, all defined by the axial force equilibrium resulting from thrust forces or lifts created in gaps 92 and 96 and any external axial force applied to the shaft with respect to the sleeve. Generally speaking, the direction of fluid flow through the bearing will be from the reservoir 100 through the lower equilibrium groove 104 and radial bore 102, which is shown immediately adjacent the thrust plate 74 and the counter plate 76. Bore 102 and groove 104 connect the inner boundary of the lower thrust bearing to the reservoir 100, forcing an ambient pressure boundary condition. If the gap around the lower portion of the shaft, specifically between shaft and counterplate 76 and shaft and shield 84 is large enough, it satisfies the requirements on bore 102, which in mm may be left out. The circulating fluid will enter the thrust bearing through the radial bore 102 from the center bore reservoir 100, and circulate through the gaps 96, 94, 92 toward the middle equipressure groove 150 in the direction indicated by the arrows 110, 112 in FIG. 5. This fluid circulation and pressure definition is enhanced by a herringbone pattern pressed or otherwise defined on the upper and lower surfaces 120, 122 of the thrust plate 74 as will be described more fully below.

Figure 8:
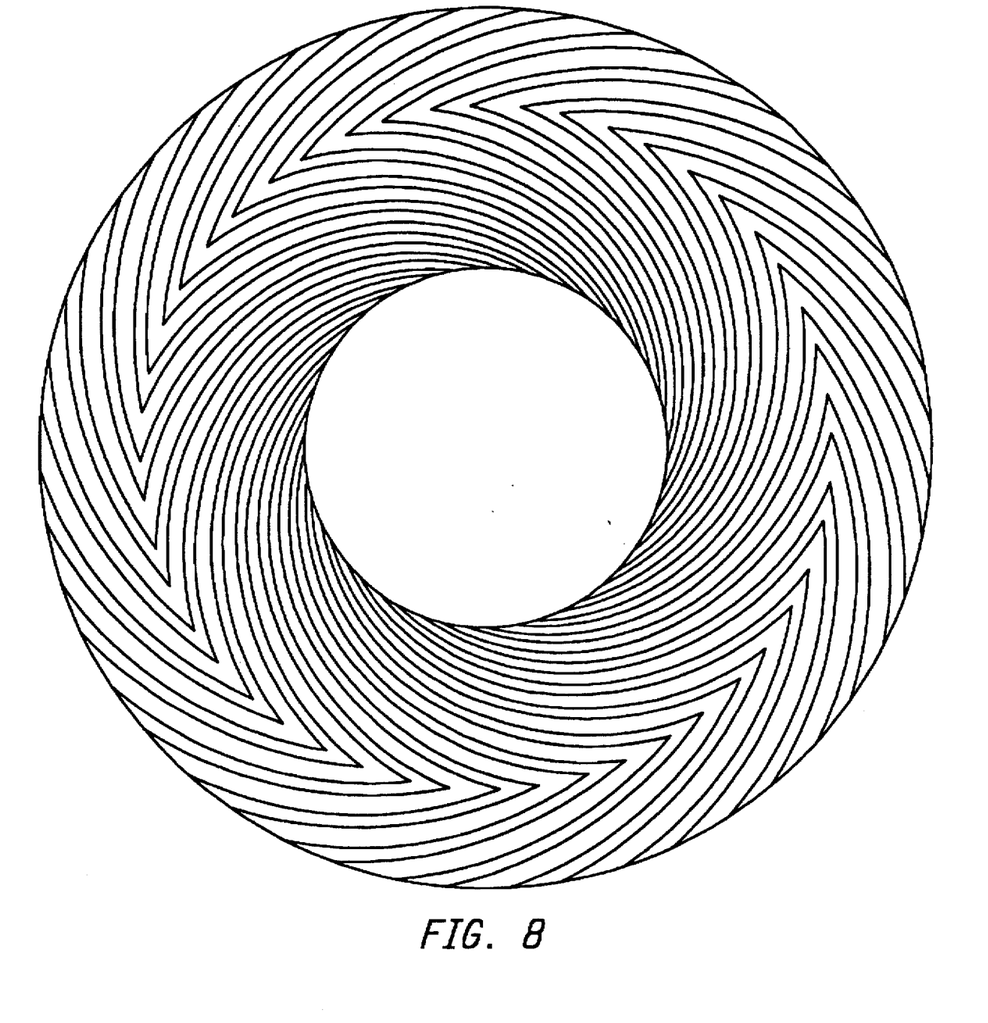
FIG. 8 shows the herringbone pattern used on the thrust bearing attached to the lower potion of the rotating shaft in the present invention.

The development of these pressure differentials is enhanced by the use of a herringbone pattern such as shown in FIG. 8 on the surfaces 120, 122 of the thrust bearing and specifically on the thrust plate rotating surfaces; the orientation of the apparent herringbone pattern being identified if one could see through the thrust plate.

The fluid circulation and necessary pressure differentials are further created by the use of upper and lower journal bearings defined between the rotating shaft 52 and the bushing 72 or sleeve 70. Alternate embodiments with spiral grooves defined on the shaft instead of on the bushings are possible without significantly altering the behavior of the design. The upper and lower journal bearings 130, 132 are separated by equipressure groove 136 and bore 134 in the rotating shaft 52 adjacent the bushing 72. The upper and lower journal beatings 130, 132 are further defined by a herringbone pattern comprising multiple (at least 2) spiral-groove axial sections pressed or otherwise defined into the surface of the bushing 72 or sleeve 70. The geometry of this pattern is such, as will be described further below with respect to FIGS. 6 and 7, that relative motion between the fluid and the sleeve 70 surface will build up a positive pressure with respect to both ends of the bearing, thereby enhancing the desired fluid circulation represented by arrows 140, 142 of FIG. 5 and maintaining the fluid within the journal bearing rather than allow it to escape into the region of the support for the hard disk drives.

The upper journal bearing 130 is also defined between the rotating shaft 52 and sleeve 70, and has a similar groove pattern as described with respect to the lower journal bearing—that is, comprising a herringbone pattern—such that positive pressure is built up and established with respect to both ends of the bearing.

As previously mentioned, the path of the circulation of the fluid through the journal bearing and the thrust bearing includes an equipressure groove 136 and a radial bore 134, and a reservoir 100 which comprises a center bore in the rotating shaft, filled with lubricant. If gas bubbles or a void should appear in the fluid, they will be trapped in this center bore due to the centrifugal force differential between the heavier circulating fluid and the lighter bubble, thereby diminishing the prospect of a bubble or void appearing in one of the thrust or journal bearings. This quality is especially important during the assembly process where it is used to fill and bleed the bearing properly.

It should also be noted that the radial thrust plate gap or cavity 94 adjacent the end of the radial thrust plate 74 and between that end and the sleeve 70, is also filled with lubricant. The cavity is large enough to enforce an infinite manifold boundary condition between the two thrust bearings defined in gaps 92, 96.

The upper equipressure groove 136 and radial bore 134 connect the upper boundary of the lower journal bearing 132 and the lower boundary of the upper journal bearing 130 to the reservoir 100, thus enforcing an ambient pressure boundary condition. The circulating fluid thus can leave the journal bearings through the radial bore and travel into the center bore reservoir 100 in order to maintain proper fluid circulation. A middle equipressure groove 150 is also provided at the junction or intersection between the lower journal bearing 132 and the upper thrust bearing 92. This groove is filled with lubricant and is large enough to enforce an infinite manifold boundary condition between the upper thrust bearing and lower journal bearing.

The hydrodynamic bearing of the present invention further includes a capillary seal 160 which is the radial gap between the rotating shaft 52 and the sleeve 70, the gap between these two facing surfaces of these two members having a progressively increasing width as shown here at 162. The capillary action due to the surface tension in the fluid prevents the fluid in the hydrodynamic bearing from spilling out of the bearing in a standstill condition. The bearing further includes a gas trap 170. As noted above, the shield 84 inhibits any net fluid or gas flow through the bearing assembly. However, gases may still leave the fluid at the upper boundary of the upper journal bearing. Further, lubricant droplets created under excessive shock may also be defined, and are collected in this same gas trap 170. The ability to prevent exiting of particles or gases from the hydrodynamic bearing is further enhanced by a seal 172 formed by the curved walls of the hub 174 rotating over the upper extent of the sleeve 70. This seal forms a further barrier in the path between the head disk assembly and the gas trap 170 defined below.

As a further protection, the lower surface of the hub 180 and the vertical surface 181 of the stationary sleeve support barrier coatings. These coatings on the surfaces delimiting axially the gas trap 170 should be mated with a non-wetting material to prevent fluid creep from the bearing into the gas trap. These coatings should be applied as well to the surfaces of the seal 172, including the hub 174. These barrier coatings are important because without them, the seal will lose much of its sealing function, since evaporation from a wet surface is at a maximum in a narrow gap.

The outer circumferential surface 182 of the gas trap, defined by an inner surface of the sleeve, is also coated with absorbent material or holds a ring of absorbent material on the surface thereof, to eliminate condensing gases and bind droplets accumulating in the gas trap 170.

Figure 6:
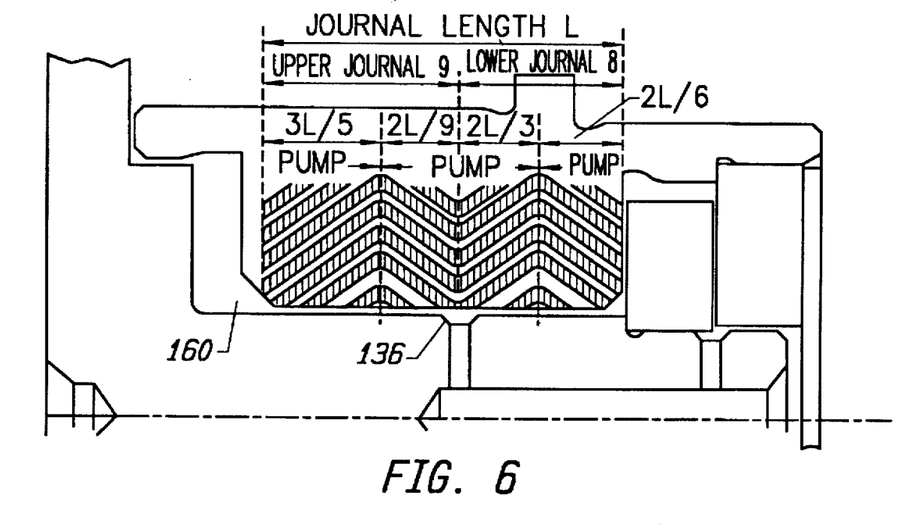
FIG. 6 is a sectional view similar to FIG. 4 useful in illustrating the journal grooving pattern of the hydrodynamic bearing of FIG. 4.
Figure 7:
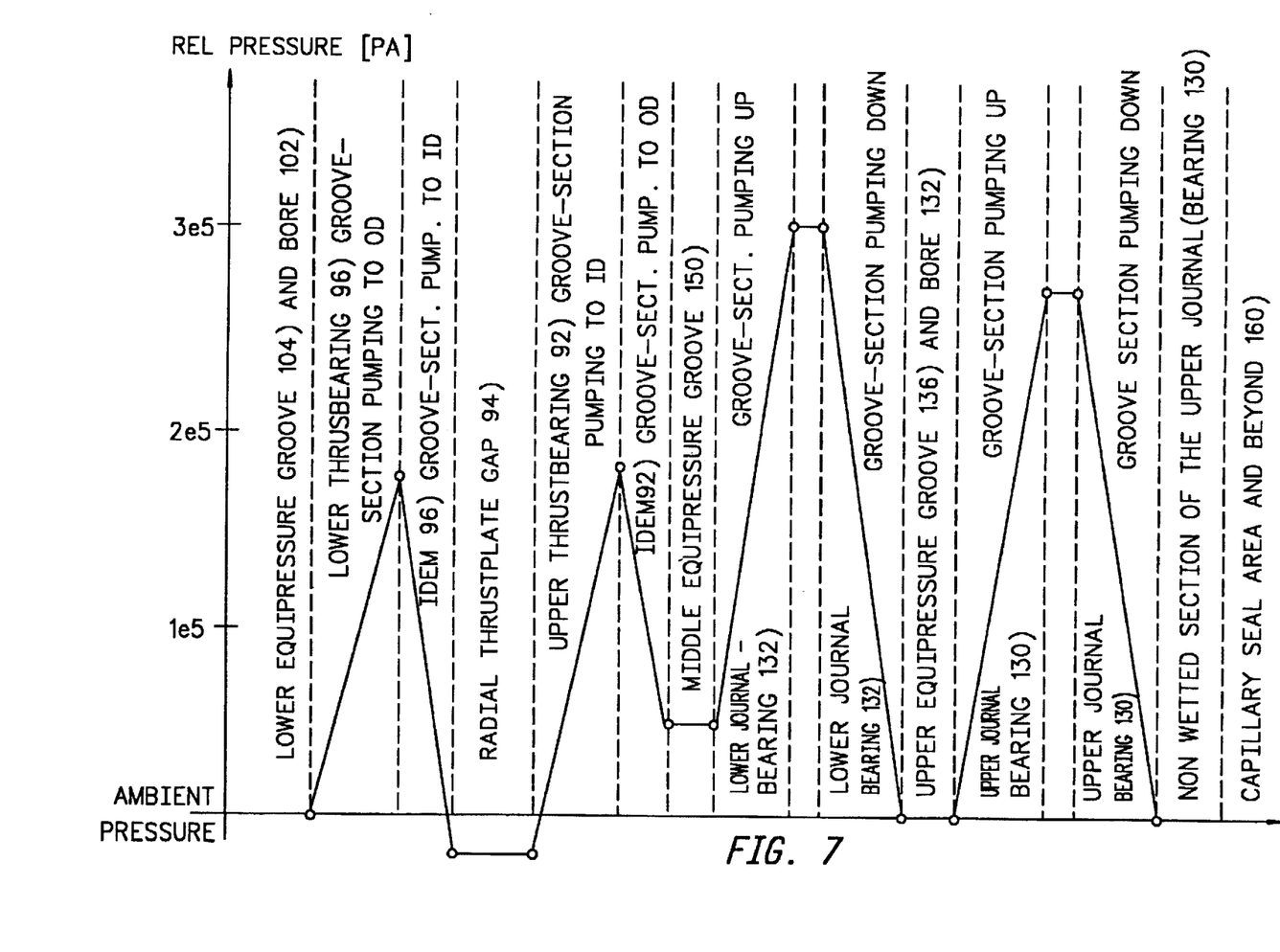
FIG. 7 is a illustration of the pressure gradient distribution achieved in the hydrodynamic bearing shown in FIG. 4.

Finally, referring to FIGS. 6 and 7, FIG. 6 shows the journal grooving pattern on the surface of the stationary sleeve or bushing 72 facing the rotating shaft. FIG. 7 shows the pressure distribution throughout both the journal bearing and the upper and lower thrust bearings. The upper journal bearing 130 is defined by the herringbone pattern comprising two axial sections of spiral grooves defined on the sleeve surface of the bearing. The lower grooved section is bounded by the upper equipressure groove 136 and pumps fluid toward the capillary seal 160. The upper grooved section is bounded by the capillary seal 160 and pumps fluid away from that seal. In order to achieve fluid level balancing, the upper grooved section is considerably longer than the lower one, as shown in FIG. 4 where the grooved sections have approximately 3:2 ratio, and the direction of pumping is clearly illustrated. Thus, the dominant direction of pumping in the upper journal will be toward the bore 134, while the pumping effect in the lower journal will be relatively balanced. If the wetted sections of the bearings containing the fluid covers an equal surface of each of the upper and lower grooved sections, the fluid level remains constant since the bearing is bounded on both sides at ambient pressure. If the fluid level increases, covering more of the upper grooved section, a net force will create a fluid movement evacuating the upper grooved section until the balance is restored. If the fluid level decreases, the opposite action appears. Thereby the wetted surface of the hydrodynamic bearing is constantly maintained under the present design.

It should also be noted that the thrust plate 74 is sitting against a step 75 in the rotating shaft 52. This reduces the grooved surface which is apparent to the bearing on the upper thrust bearing 96 with respect to the lower thrust beating 92. Thus, the net force from bearing 96 toward bearing 92 is created, establishing the fluid flow direction in the direction of the arrow 112 shown in FIG. 5.

Figure 9A:
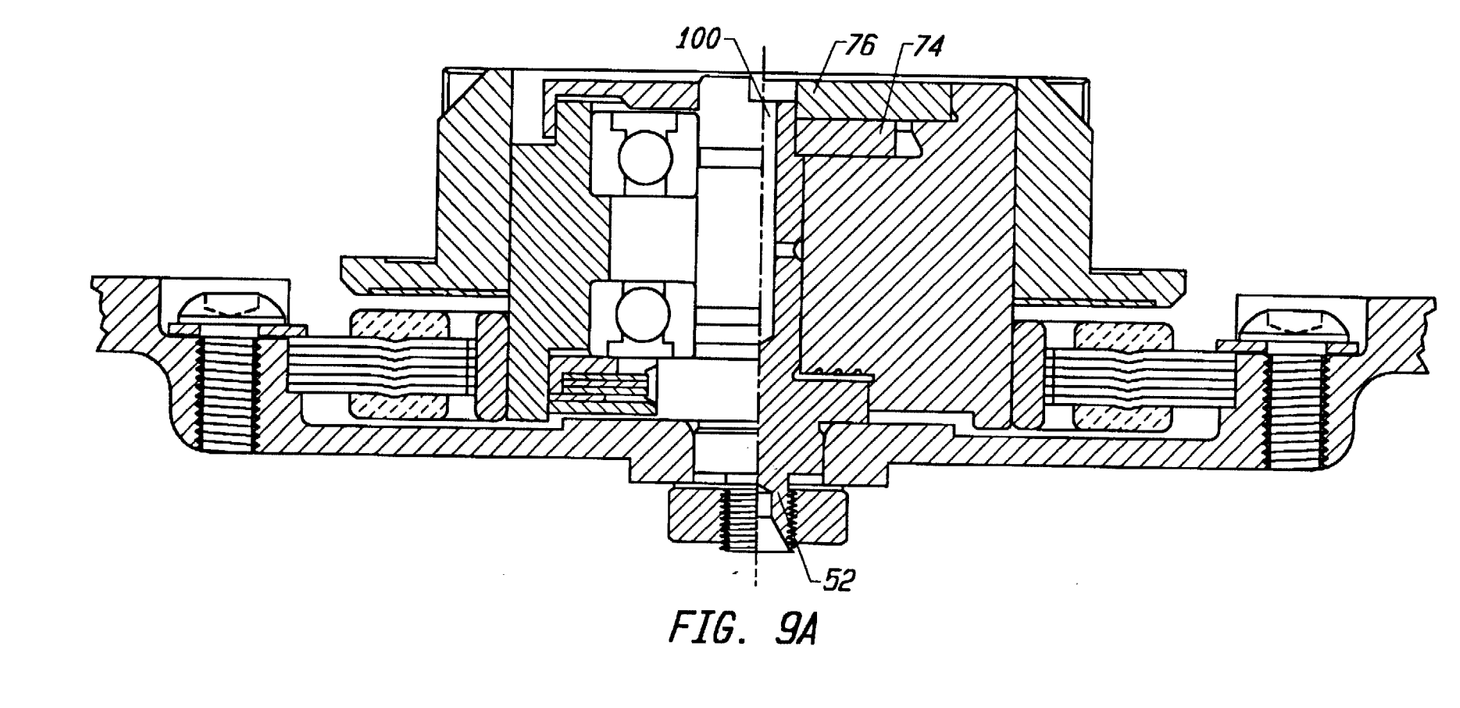
FIG. 9 is a vertical sectional view of an alternative embodiment of this invention utilizing a fixed shaft.
Figure 9B:
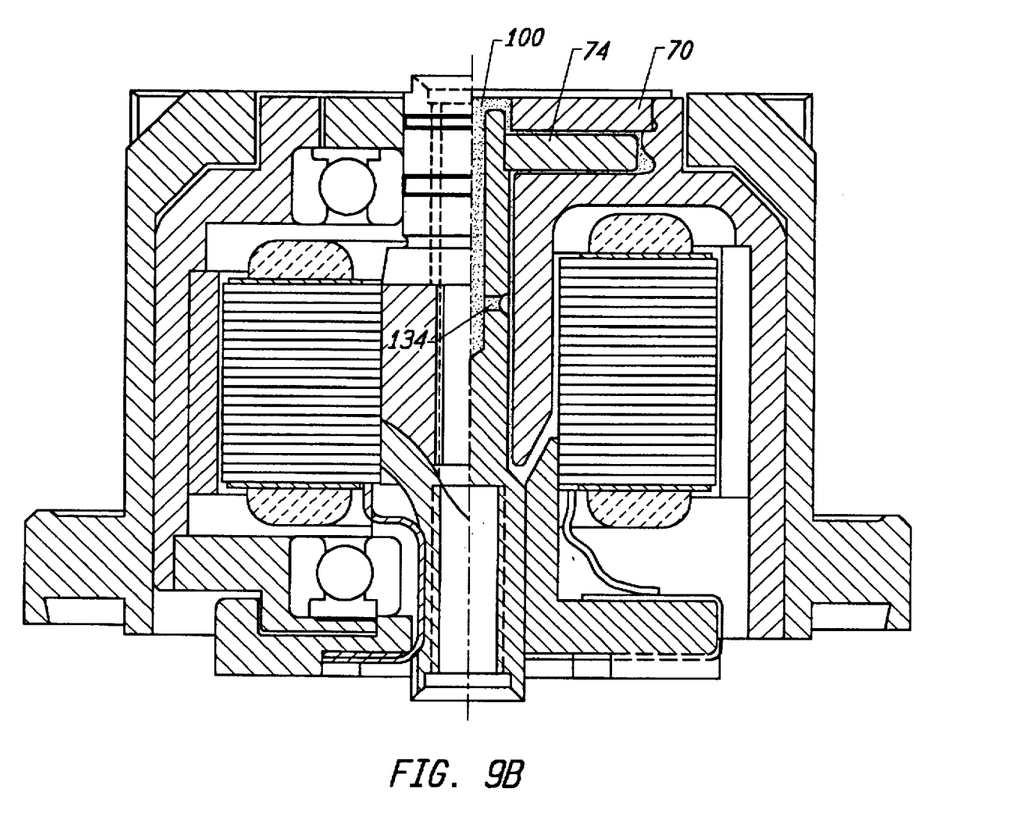

Other features and advantages of the present invention may become apparent to a person of skill in the art who studies the present invention disclosure. For example, the herringbone pattern, although the journal bearing's herringbone pattern is preferably on the sleeve of the bearing, it can be on the shaft as well. Also, the design principles of the present invention can be applied to a stationary shaft motor as well. In such a design (see FIGS. 9A and 9B), the sleeve 70 and hub 54 would rotate; the shaft 52 and thrust plate 74 would be stationary. The bore 102 adjacent the thrust bearing 74 would typically not be present; rather the fluid would come out of the reservoir 100 and move between the counterplate 76 and shaft 52 into the thrust bearing gap. Therefore, the scope of the present invention is to be limited only by the following claims.

What is claimed is:

1. In a motor including a shaft and a housing, said housing having a sleeve for receiving said shaft, said shaft and said sleeve defining a gap therebetween; having a first closed end and a second open end, a hydrodynamic bearing comprising at least one set of asymmetric grooves on said shaft or sleeve aligned to pump hydrodynamic fluid along said shaft, and a thrust plate coupled to said shaft at said first closed end thereof, said thrust plate having an upper and a lower surface, said surfaces having grooves thereon to pump fluid toward said shaft and away from said closed end, said one set of asymmetric grooves along said shaft pumping fluid toward said thrust plate so that the fluid level in the gap is balanced and said hydrodynamic fluid remains in the bearing.

2. The hydrodynamic bearing of claim 1 wherein said one set of asymmetric grooves comprises two sections defining two journal bearings along said shaft, one of said two sections pumping said fluid toward said thrust plate, another of said two sections pumping said fluid away from said thrust plate.

3. The hydrodynamic bearing of claim 1 wherein said hydrodynamic fluid forms a single capillary seal near said second open end of said shaft opposite said closed end and said thrust plate.

4. The hydrodynamic bearing of claim 1 wherein each of said upper and lower surfaces of said hydroyamic bearing have grooved sections pumping both toward and away from said closed end of said shaft.

5. A hydrodynamic fluid bearing for an electric motor comprising:

a shaft;

a thrust plate coupled to a first end of the shaft;

a housing having a journal sleeve for receiving the shaft with a first portion having a diameter slightly larger than the shaft and a second portion having a second larger diameter slightly larger than the thrust plate;

an end cap inserted into the second diameter portion of the housing sealing the thrust plate off from the outside atmosphere and defining a first closed end for said shaft, a second end of said shaft being open; and said hydrodynamic bearing comprising at least one set of asymmetric grooves on said shaft or sleeve aligned to pump hydrodynamic fluid along said shaft, and a thrust plate coupled to said shaft at a first end thereof, said thrust plate having an upper and a lower surface; said surfaces having grooves thereon to pump fluid toward said shaft and away from said closed end, said one set of asymmetric grooves along said shaft pumping fluid toward said thrust plate so that the fluid level in the gap is balanced and said hydrodynamic fluid remains in the bearing.

6. A hydrodynamic bearing as claimed in claim 5 wherein said shaft and said sleeve include upper and lower journal bearings defined by said shaft and said sleeve.

7. A hydrodynamic bearing as claimed in claim 6 wherein said journal bearings are formed by asymmetric grooves having a herringbone shaped pattern.

* * * * *

UNITED STATES PATENT AND TRADEMARK OFFICE
CERTIFICATE OF CORRECTION

PATENT NO. : 5,685,647
DATED : November 11, 1997
INVENTOR(S) : Leuthold et al.

It is certified that error appears in the above-indentified patent and that said Letters Patent is hereby corrected as shown below:

On the title page:
At [75] after "Pleasanton;" delete [Guenther] and insert -- Gunter --.

Signed and Sealed this

Third Day of November, 1998

Attest:

BRUCE LEHMAN

Attesting Officer

Commissioner of Patents and Trademarks